United States Patent
Hosono et al.

(10) Patent No.: US 7,428,085 B2
(45) Date of Patent: Sep. 23, 2008

(54) METHOD FOR PRODUCING HOLOGRAM BY PICO-SECOND LASER

(75) Inventors: Hideo Hosono, Kanagawa (JP);
Masahiro Hirano, Tokyo (JP); Kenichi Kawamura, Kanagawa (JP); Taisuke Miura, Kanagawa (JP); Hayato Kamioka, Kanagawa (JP)

(73) Assignee: Japan Science and Technology Agency, Kawaguchi-shi (JP)

( * ) Notice: Subject to any disclaimer, the term of this patent is extended or adjusted under 35 U.S.C. 154(b) by 701 days.

(21) Appl. No.: 10/504,634

(22) PCT Filed: Feb. 13, 2003

(86) PCT No.: PCT/JP03/01514

§ 371 (c)(1),
(2), (4) Date: Apr. 15, 2005

(87) PCT Pub. No.: WO03/069416

PCT Pub. Date: Aug. 21, 2003

(65) Prior Publication Data

US 2006/0019171 A1    Jan. 26, 2006

(30) Foreign Application Priority Data

Feb. 13, 2002    (JP)    ............................. 2002-036010

(51) Int. Cl.
*G03H 1/02*    (2006.01)
(52) U.S. Cl. ................................ 359/27; 359/35; 359/3
(58) Field of Classification Search ..................... 359/27
See application file for complete search history.

(56) References Cited

U.S. PATENT DOCUMENTS

| | | | | |
|---|---|---|---|---|
| 5,786,560 A | * | 7/1998 | Tatah et al. | ............ 219/121.77 |
| 6,633,419 B2 | | 10/2003 | Hosono et al. | |
| 7,031,571 B2 | * | 4/2006 | Mihailov et al. | ............... 385/37 |
| 2006/0044639 A1 | * | 3/2006 | Misawa et al. | ................ 359/35 |

FOREIGN PATENT DOCUMENTS

| | | |
|---|---|---|
| JP | 10-105029 | 4/1998 |
| JP | 2001-236002 | 8/2001 |

* cited by examiner

*Primary Examiner*—Fayez G Assaf
(74) *Attorney, Agent, or Firm*—Westerman, Hattori, Daniels & Adrian, LLP.

(57) ABSTRACT

Disclosed is a method of producing a hologram through a two-beam laser interfering exposure process, which comprises emitting a coherent laser light with a pulse width ($\tau$) ranging from greater than 900 femtoseconds to 100 picoseconds and a laser power of 10 µJ/pulse or more using a solid-state laser as a light source, dividing the pulses light from the laser into two beams, controlling the two beams temporally and spatially in such a manner that the two beam are converged on a surface of or inside a workpiece for recording a hologram while matching the respective converged spots of the two beams with one another temporally and spatially to create the interference therebetween so as to record a surface-relief hologram on the surface of the workpiece or an embedded hologram inside the workpiece in an irreversible manner. The present invention can solve a problem with a conventional process of recording a hologram in a non-photosensitive material in an irreversible manner using interfering femtosecond laser pulses, specifically, distortion in the waveforms of pulsed laser beams and resulting instability in recording of an embedded hologram due to a non-linear optical interaction between the femtosecond laser pulses and air/the material.

9 Claims, 3 Drawing Sheets

ENLARGED PHOTOGRAPH

METHOD FOR PRODUCING HOLOGRAM BY PICO-SECOND LASER

TECHNICAL FIELD

The present invention relates to a method of producing a micro-hologram in a transparent compound, semiconductor, organic material or metal, using interfering laser pulses with high energy density, and a hologram produced through the method.

BACKGROUND ART

A method of preparing holographic optical elements or diffraction grating elements by utilizing the interference between leaser beams is one of well-known techniques commonly used for years. The diffraction gratings produced by the interfering laser exposure are applied to various devices, such as spectrometer, distributed feedback semiconductor lasers or fiber grating devices. The laser for use in the production process of such diffraction gratings includes a He—Cd laser, an argon ion laser, an excimer laser, a continuous wave laser or a nanosecond pulsed laser. These lasers can emit a beam with a relatively low energy density, and thereby a material to be processed is required to have photosensitivity. The inventors previously developed a method of producing holographic optical elements by utilizing the interference between femtosecond leaser beams.

In this method, the femtosecond leaser beams having a high energy density makes it possible to record a diffractive grating in almost all materials without the need for photosensitivity in a material to be processed. However, the femtosecond pulsed beam having an excessively high energy at a pulse peak causes increase in the non-linear optical interaction of the beam with air and a hologram-recording martial, resulting in difficulties in stably recording a hologram.

Particularly, in the process of forming an embedded hologram in the inside of a material, it is essential to propagate laser pulses with a high energy through the material, and the waveform of the laser pulses is liable to be irregularly deformed. Thus, in order to suppress such a distortion, it is required to select a specific material, or set the laser energy just below the threshold value for the encoding for recording a allowing the influence of the non-linear optical interaction to be ignored. However, the acceptable energy range of the laser pulse is narrow, and it is extremely difficult to record a hologram having a desired performance.

DISCLOSURE OF INVENTION

As mentioned above, the conventional process of recording a pure irreversible hologram in a non-photosensitive material using interfering femtosecond laser pulses involves a problem concerning the distortion in the waveforms of pulsed laser beams due to a non-linear optical interaction between the femtosecond laser pulses and air/the material. Such instability makes it very difficult to record an embedded hologram.

In view of this problem, it is an object of the present invention to provide a method recording an embedded hologram using mutually-interfering laser beams with a pulse width ($\tau$) in a picosecond ($10^{-12}$ sec) range which is obtained by chirping a femtosecond pulsed laser. The method of the present invention uses a pulsed laser light obtained by increasing the pulse width ($\tau$) of a femtosecond pulsed laser light up to the range of greater than 900 femtoseconds to 100 picoseconds (hereinafter this laser pulse is referred to as "picosecond pulse"), while maintaining the integrated laser energy of the femtosecond pulsed laser light, through the use of a technique of relaxing the phase matching of a femtosecond pulsed laser light based on chirping, so as to allow an embedded hologram to be recorded with excellent reproducibility through a interfering two-beam laser exposure technique.

In the method of the present invention, the pulse width is increased while maintaining energy per pulse at a constant value. Thus, the peak value of the laser energy is lowered so that the non-linear optical interaction between the pulsed laser light and a material is suppressed so as to reduce the distortion in waveform of the pulsed laser light even during propagation through the material to allow an embedded hologram to be stably recorded inside the material.

A method of recording an embedded hologram using interfering femtosecond laser beams has already been proposed by the inventors. The present invention is intended to improve this method so as to provide a method of recording an embedded hologram in any depth of a material and a method of recording the hologram in a multiple encoding, based on a pulsed laser light having a pulse width increased up to the range of greater than 900 femtoseconds to 100 picoseconds.

The present invention is directed to a method of forming 1-dimensional or 2-dimensional hologram embedded in a material, and a method of forming one or more holograms within a single or common material, based on interfering pulsed laser beams to be emitted onto the material.

Specifically, the present invention provides a method of producing a hologram through a two-beam laser exposure process. The method comprises emitting a coherent laser light with a pulse width raging from greater than 900 femtoseconds to 100 picoseconds and a laser power of 10 µJ/pulse or more using a solid-state laser as a light source, dividing the pulse light from the laser into two beams, and conversing the two beam on a surface of or within a material for recording a hologram while colliding the two beams temporally and spatially in such a manner that the respective converged spots of the two beams are matched with one another temporally and spatially to create the interference therebetween so as to record a irreversible surface-relief hologram on the surface of the material or an irreversible embedded hologram inside the material.

In the above method of the present invention, a femtosecond pulsed laser light may be generated from a mode-lock titanium-sapphire laser, and the phase compensation of the pulsed laser light is relaxed to allow the laser pulse to having a pulse width increased up to the range of greater than 900 femtoseconds to 100 picoseconds.

In the method of the present invention, the converged spots of the two beam may be matched with one another temporally and spatially according to either one of the third harmonic generation (THG) of a femtosecond laser light induced by the non-linearity of air, or the second harmonic generation (SHG) of a femtosecond laser light induced by a optical non-linear crystal, and then the pulse width of the laser pulse may be increased up to the range of greater than 900 femtoseconds to 100 picoseconds while maintaining the optical arrangement of the two-beam laser exposure system unchanged to provide a temporally/spatially matched spot of the two beams.

In the method of the present invention, the irreversible embedded hologram may be recorded in a depth of 10 µm or more from the surface of the material.

In the method of the present invention, the two-beam laser exposure process may performed multiple times to record a multiples either of identical or different holograms at the same or different positions within the material.

The method of the present invention may includes, after recording the hologram on the surface of or inside the material, changing the depth of the matched spot from the surface of the material to record multiple holograms in a multiple exposure method.

The method of the present invention may include, after recording the hologram on the surface of or inside the material, rotating the material by 90-degree, and irradiating the interfering two beams to form a 2-dimensional hologram.

The present invention also provides a hologram which is formed in a material in a given structure including a surface-relief and an embedded structure through the above method. The workpiece is made of either one of a compound material which is transparent to a visible light, a semiconductor material and a metal material.

In place of a conventional method of producing a hologram using a photosensitive material through a two-beam laser exposure process, the inventors developed a two-beam laser interfering exposure process using a femtosecond laser to achieve a method capable of recording a hologram in an organic material, inorganic material, semiconductor material or metal material which originally has no photosensitivity, by use of a pair of femtosecond pulsed beams divided from a single fs pulsed laser light, and filed a patent application (Japanese Patent Laid-Open Publication No. 2001-236002, EP 1,162,519).

This hologram encoding method through the two-beam laser interfering exposure process comprises of a pulsed laser light from a light source consisting of a solid-state femtosecond laser capable of generating a pulsed laser light equal or close to the Fourier transform limit, with an oscillation wavelength of about 800 nm in the near-infrared region, a pulse width τ ranging from greater than 10 femtoseconds to 900 femtosecond, and a peak power of 1 GW or more, dividing the pulsed laser light into two beams using a beam splitter, and converging the two beams on a surface of or inside a workpiece for recording a hologram, at an energy density of 100 GW/$cm_2$ or more while temporally controlling the two beams through an optical delay circuit and spatially controlling the two beams using a mirror having a finely rotatable flat or concave reflection surface in such a manner that the converged spots of the two beams are matched with one another temporally and spatially, so as to record a hologram in the workpiece consisting of a transparent material, a semiconductor material or metal material in a irreversible manner, based on ablation of the workpiece and/or structural change in the atomic arrangement of the workpiece and/or change in the refractive index of the workpiece which are caused by the high energy irradiation.

When the material is irradiated with a pulsed laser beam having high energy, the laser energy is first absorbed by electrons in the material. It is believed that a time of about 100 picoseconds is required for allowing the energy of the electrons to be converted into the vibration energy of atoms in the material or the vibration energy of atoms constituting the workpiece or the heat energy of the workpiece. Then, when the density of the electron energy goes beyond a given threshold value, the resulting ablation or structural change in the workpiece causes an irreversible change in the workpiece. In this case, if the laser energy per area is set such that the density of the electron energy in the boundary between the bright and dark portions in the interference pattern is equal to the threshold value, the interference pattern will be transferred to the material or a irreversible hologram is recorded in the workpiece.

That is, in the state before the duration of the laser pulse reaches about 100 picoseconds, the energy to be stored in the electron system is dependent only on the entire energy of a laser pulse, but not on the width of the laser pulse. In contrast, when the laser pulse width τ becomes greater than about 100 picoseconds, the energy of the electron system is relaxed or absorbed in the lattice system even during laser irradiation, and the energy to be stored in the electron system is dependent on the width of the irradiated laser pulse. More specifically, a laser energy to be effectively used in recording a hologram Ef is expressed by the following formula:

$$Ef = a \times Et \qquad \tau < \sim 100 \text{ picoseconds}$$
$$= a \times (Et) \times (\sim 100 \text{ picoseconds}/\tau) \quad \tau > \sim 100 \text{ picoseconds},$$

where τ is a laser pulse width, Et is an total energy per laser pulse, and a is a proportional constant.

Further, the energy peak value of the laser pulses is provided by Et/τ, and the influence of the optical non-linear interaction, or deformation in the waveform of the laser pulse during propagation, is reduced as the energy peak value is lowered. Thus, if the laser pulse width is increased from the level of femtoseconds to the level of 10 picoseconds while maintaining the entire laser energy Et at a constant value, a hologram can be stably recorded. Further, in case of recording a hologram embedded in a material, the pulsed laser beams should be propagated through the material. Thus, the effective energy Ef at a value equal to or greater than the threshold value, and by encoding the pulse width τ up to about 10 picoseconds, which reduces the distortion of the waveform due to the propagation through the material by setting an embedded hologram can be encoded in a depth of 10 μm or more from the surface of the distortion of the waveform due to the propagation through the material by setting material.

In the picosecond pulses, the generation of harmonics from air or non-linear optical crystals is significantly reduced due to the lowered peak energy of the leaser pulses, and thereby it is difficult to achieve the spatial and temporal matching between the two pulsed laser beams based on the above principle. Thus, femtosecond laser beams having a high peak energy are first used to achieve spatial and temporal matching therebetween, and then the laser pulse width τ is expanded keeping the optical configuration unchanged through a process of relaxing the phase matching of a laser light based on chirping. In this manner, the temporal and spatial matching can be maintained even between the picosecond pulses to allow an embedded hologram to be recorded. In case where a diffraction grating is written in an optical fiber or an optical waveguide, it is required to write the diffraction grating in a core region on the inside of a cladding layer at an embedding depth of 10 μm to 2 mm. In the method of the present invention, the embedding depth can be freely controlled by the converged spots to eliminate any restriction on the embedding depth.

A plurality of wavelength components exist in a laser resonator because the gain of a laser medium includes a certain width in wavelength. When these lights are propagated through the laser medium, their propagation velocity is varied according to wavelength because of the wave length dependence of the refractive index. That is, while the laser resonator has a fixed physical length, its optical length is varied depending on wavelength. Thus, the round-trip time of the resonator is also varied depending on wavelength. The difference in the round-trip time of the resonator depending on wavelength can be completely cancelled for all of the wavelengths, through a phase-compensation technique using a prism or the like. This state is referred to as "mode lock".

When the bandwidth as the gain of the laser medium is small, the temporal width of a mode-locked laser pulse is in the level of picoseconds. At the same time, a femtosecond laser pulses can also be obtained by using a laser medium having a wide bandwidth of the gain, such as titanium-sapphire. Thus, a phase-compensation circuit incorporated in a femtosecond laser resonator can be reversely operated to increase the temporal pulse width τ up to the range of greater than 900 femtoseconds to 1 picosecond. This state is referred to as "wavelength chirping". Further, a phase-compensation circuit (pulse compensation circuit) incorporated in a regenerative amplifier can be adjusted to create a wavelength chirping so as to vary the pulse width τ in the range of greater than 900 femtoseconds to 100 picoseconds without reducing the total energy per pulse.

The expansion of the pulse width τ can be performed before the laser light is divided into the two laser beams using interfering exposure optical system. Thus, even if the pulse width τ is expanded through the chirping technique, the state of the temporal and spatial marching will not be changed. While a hologram may be recorded in the pulse width range of greater than 900 femtoseconds to 100 picoseconds, it is preferable to set the pulse width τ in the range of greater than 1 picosecond to 10 picoseconds.

BRIEF DESCRIPTION OF DRAWINGS

FIGS. 2A and 2B are photographs showing a scanning electron microscope (SEM) image of the section of a hologram produced in Example 1, wherein FIG. 2B is a expanded photograph of FIG. 2A.

BEST MODE FOR CARRYING OUT THE INVENTION

Figure 1:
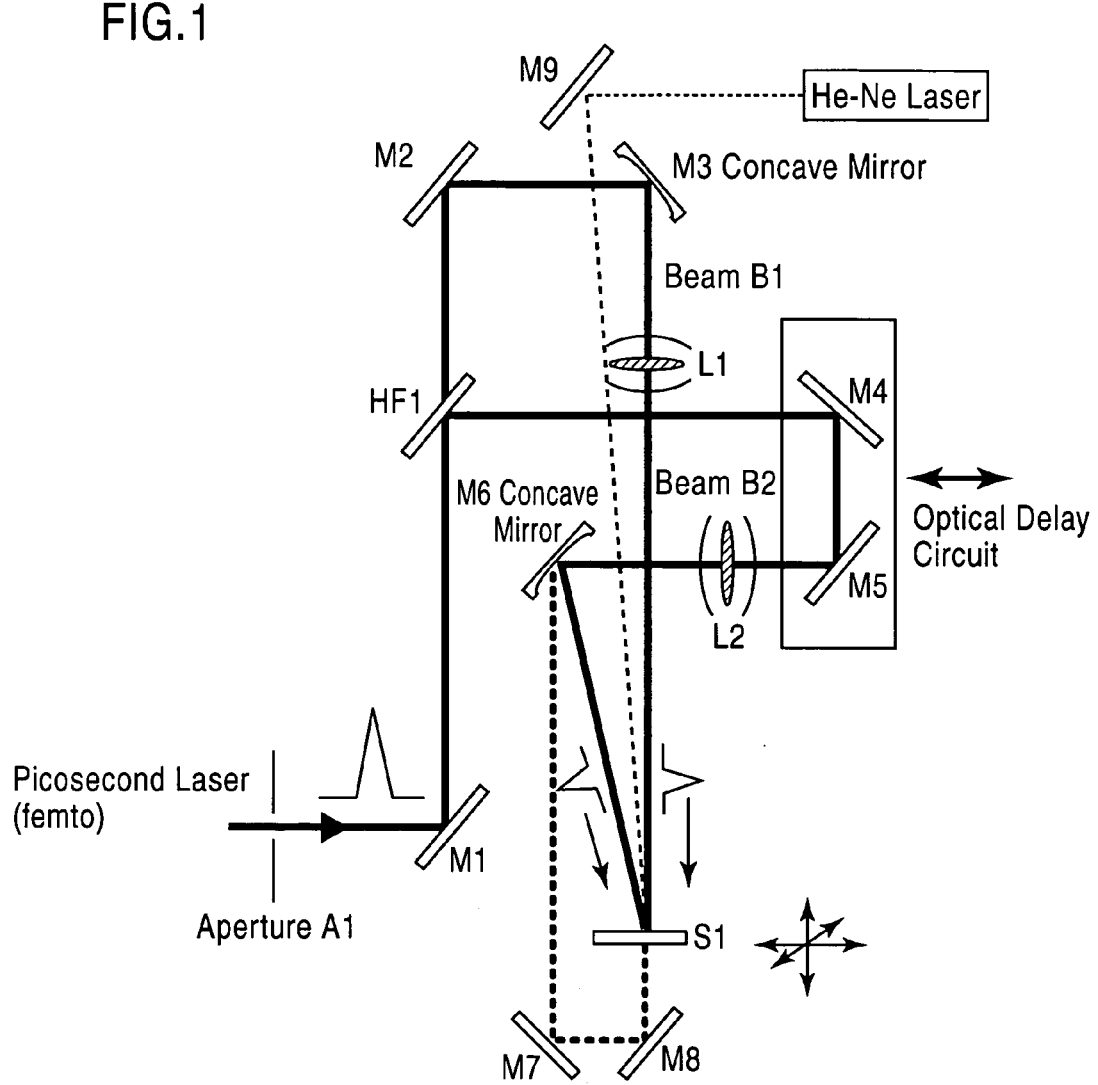
FIG. 1 is a schematic diagram showing a two-beam laser interfering exposure apparatus for use in a method of the present invention.

FIG. 1 is a schematic diagram showing a laser interfering exposure apparatus for use in a method of the present invention. A laser light emitted from femtosecond/picosecond laser light source is reflected by a flat plane mirror M1, and then divided into a beam B1 and a beam B2 by a half mirror HF1 serving as a beam splitter. The beam B1 is reflected by a flat mirror M2 and a concave mirror M3, and converged on a surface of or within a workpiece S1. A combination of a flat mirror and a thin lens L1 may be used as a substitute for the concave mirror M3. The beam B2 is reflected by a flat mirror M4, a flat mirror M5 and a concave mirror M6, and converged on the surface of or within the workpiece S1. A combination of a lens L2 and a flat mirror may be used as a substitute for the concave mirror M6.

An optical path indicated by the solid line is used in producing a transmission hologram. Otherwise, an optical system indicated by the thick dotted line is used in producing a reflection hologram. Specifically, the beam B2 reflected by the concave mirror 6 is converged within the workpiece using the flat mirror M7 and the flat mirror M8. A combination of the lens L2 and a flat mirror may be used as a substitute for the concave mirror M6. As indicated by the thin dotted line in FIG. 1, a hologram formation process may be monitored by reflecting a He—Ne laser light by a flat mirror M9 toward the workpiece S1, and detecting a reflected light from the workpiece S1.

The flat mirror M4 and the flat mirror M5 serves as an optical delay circuit. Specifically, each of the flat mirror M4 and the flat mirror M5 is finely moved in the level of 1 μm using a micrometer caliper to adjust the difference between the respective optical path lengths of the beam B1 and the beam B2 so as to temporally match the converged spots of the two beams with one another. Further, the converged spots of the two beams are positionally or spatially matched with one another by finely rotating either one of the concave mirror M3, the concaved mirror M6 and the flat mirror M8 using a micrometer caliper. In order to prevent the deterioration in coherence, each of the lenses L1 and L2 is preferably designed to have a minimized thickness and a long focal distance. In this arrangement, the beam polarization plane at the workpiece is parallel. An optical parameter, such as the fringe interval of a diffraction grating to be formed, or a focal distance in case where the optical system has a lens function, can be determined in the same manner as that in the conventional two-beam laser interfering exposure using a continuous wave laser light. The workpiece S1 is placed on an X-Y stage, and finely moved using a micrometer caliper to allow a hologram to be recorded at a designated position of the workpiece.

The two-beam laser interfering exposure apparatus is required to have an optical system capable of performing a positional adjustment in μm scale. As an apparatus having a highly-accurate positional control performance capable of meeting the requirement, the two beams are converged on the surface of or within the workpiece using the optical system having the finely controllable optical delay circuit, the finely rotatable plane and concave mirrors and the function for detecting the convergence/matching of the two beams, so as to allow the two converged spots to be matched with one another temporally and spatially. The temporal and spatial matching can be obtained by adjusting the optical relay circuit while monitoring the intensity of a third harmonic generation (THG) induced by the third-order non-linear effects of air, to maximize the intensity. Instead of air, a non-linear optical crystal may be used to utilize a second harmonic generation (SHG) therefrom.

A laser light having an oscillation wavelength of about 800 nm in the near-infrared region, a temporal pulse width of about 100 femtoseconds, and a high energy of 10 μJ or more, is divided into two beams, and then the two beams are converged onto a single point. During this operation, the optical delay circuit and the beam-converging optical system are adjusted while monitoring the intensity of either one of a third harmonic generation (THG) induced by the third-order non-linear effects of air, and a second harmonic generation (SHG) induced by a non-linear optical crystal, to match the two converged beams with one another temporally and spatially so as to create the interference therebetween.

As the oscillator of femtoseconds pulses laser, a fiber laser and a solid-state laser oscillating in to near-infrared light may also be used. The workpiece is placed on a stage, and designed to be finely moved in the level of μm and finely rotated in the level of arcminutes to allow the converged spots of the two beams to be matched at a designated position. Further, the workpiece may be observed using an optical microscope to detect a specific position within the workpiece.

After the temporal/spatial matching of the two beams, the workpiece is positioned at the matched spot. In the operation for obtaining the temporal/spatial matching of the two beams, the femtosecond pulsed laser light of the mode-lock titanium-sapphire laser is regeneratively amplified to create a femtosecond pulsed laser light with a maximum energy of about 1 mj and a temporal width of about 100 femtoseconds.

The workpiece may be made of a material selected from the group consisting of silica glass, BK 5 glass, multi-component glass, MgO, $LiNbO_3$, $Al_2O_3$, ZnS, ZnSe, ZnO, YSZ (yttria stabilized zirconia), AlN, GaN, AlAs and GaAs, and mixtures thereof, and formed in bulk or thin-film to produce an embedded hologram therein.

The workpiece made of a material selected from the group consisting of silica glass, BK 5 glass, multi-component glass, MgO, $LiNbO_3$, $Al_2O_3$, ZnS, ZnSe, ZnO, YSZ (yttria stabilized zirconia), AlN, GaN, AlAs and GaAs, and mixtures thereof, and formed in bulk or thin-film may also be used to produce a surface-relief hologram therein.

Otherwise, the workpiece may be made of a metal material selected from the group consisting of gold, silver, platinum, copper, nickel, chromium, aluminum, cadmium, tantalum, hard metal and metal-silicon to produce a surface-relief hologram therein After the temporally/spatially matched spot of the two beams is obtained, the laser pulse $\tau$ is expanded up to the range of greater than 900 femtoseconds to 100 picoseconds using the wavelength chirping technique for relaxing the phase compensation, while maintain the optical parts configuration unchanged. A hologram with a diameter of about 100 μm is recorded in the workpiece placed at the matched spot of the two beams, in one cycle of the pulsing operation.

The matched spot of the interfering picosecond laser beams is position on the surface of workpiece so as to form a surface-relief hologram on the workpiece. The laser pulse width $\tau$ can be expanded to increase the depth of the fringe groove of the surface-relief hologram so as to provide enhanced diffraction efficiency of the surface-relief hologram. The matched spot may be positioned inside the workpiece to record an embedded hologram.

In an operation for recording a hologram within the workpiece, the phase compensator (pulse compression device) in the regenerative amplifier is adjusted to vary the pulse width $\tau$ in the range of greater than 900 femtoseconds to 100 picoseconds so as to determine a specific temporal width suitable for the recording of the hologram. For example, in case of producing an embedded hologram in a glass material, the pulse width is preferably set at about 2 picoseconds. Further, it is preferable to set the energy of the picosecond pulsed laser light in the range of 10 μJ to 1 mJ, the size of the matched spot at about 100 μm, and spatial density in the range of 100 to 0.1 $J/cm^2$.

After completion of the recording of one hologram or one cycle of the laser interfering exposure process, the workpiece may be moved in the longitudinal/lateral directions, and irradiated with interfering pulsed laser beams to record a plurality of holograms aligned in the depth direction or in the in-plane direction of the workpiece.

Alternatively, after completion of the recording of one hologram, the workpiece may be rotated, and irradiated with interfering pulsed laser beams to record a 2-dimensional embedded hologram therein.

EXAMPLE 1

The two-beam laser interfering exposure apparatus illustrated in FIG. 1 was used. That is, a laser was the regenerative-amplifier titanium-sapphire laser for generating a pulsed laser light with an oscillation center frequency of about 800 nm, a pulse width $\tau$ of about 100 femtoseconds, and a pulse energy of 50 μJ/pulse for each of the two beams.

The pulsed laser light was divided into two beams by the half mirror HF1, and converged by the lens L1 and the lens L2. An optical delay circuit and an optical-path positioning circuit were interposed in one of the optical paths for the beam B1 and the beam B2, and the converged spots of the two beams were matched with one another temporally and spatially according to the intensity of a third harmonic generation wave induced by air. The size of the matched spot was about 100 μm, and the peak density was calculated as about 1 $J/cm^2$. The incident angle of the beams B1 and B2 at the workpiece S1 was set at 45-degree.

Then, a pulse-width compression optical circuit in a regenerative amplifier of the titanium-sapphire laser was adjusted while maintaining the optical circuit in the same state, to create a chirping so as to increase the pulse width $\tau$ up to the range greater than 100 femtoseconds to 2 picoseconds while maintaining the energy/pulse at 100 μJ. In this state, the two beams are matched at the matched spot temporally and spatially. A silica-glass workpiece was positioned to allow the matched spot to be located at a depth of about 100 μm from the surface of the workpiece, and irradiated with the picosecond pulsed laser beams one time. The inside of the silica glass was observed using an optical microscope while changing a focal depth, and verified that a micro-hologram with a diameter of about 100 μm is recorded inside the silica glass. The silica glass was cut along the portion having the hologram recorded therein, and the section of the cut piece was etched with a hydrofluoric acid solution.

Figure 2A:
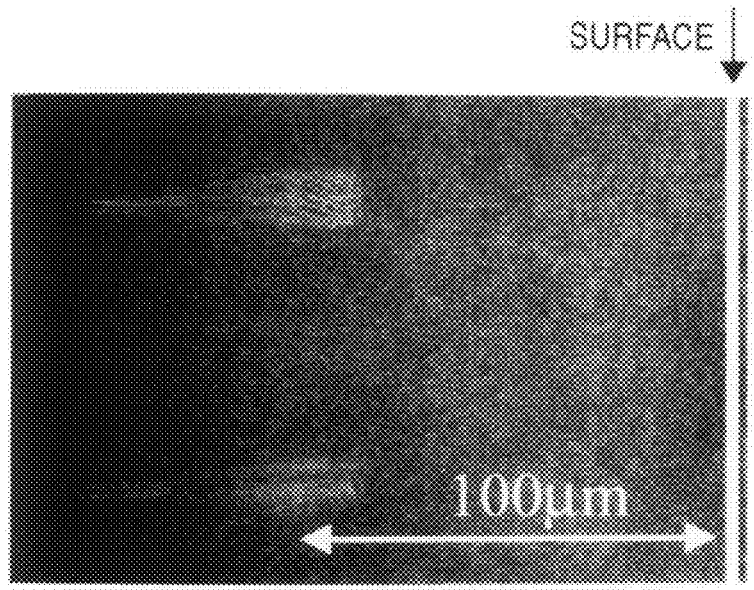
Figure 2B:
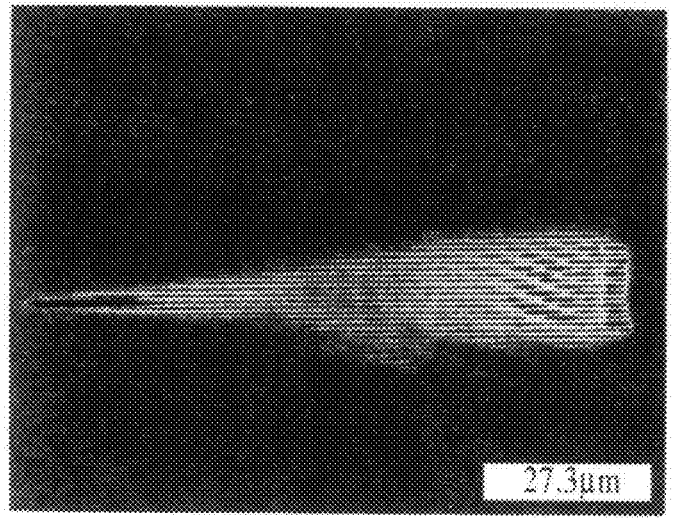

FIGS. 2A and 2B show a scanning electron microscope (SEM) image of the etched section. It could be observed that a hologram having a thickness of about 70 μm is embedded at a depth of about 100 μm from the surface of the silica glass.

When the depth is greater than about 50 μm, the diameter of the laser beams having energy greater than the threshold becomes smaller, and thereby the diameter of the hologram is gradually reduced. The embedding depth could be extended up to about 2 mm by moving the silica-glass workpiece or displacing the focal position of the picosecond laser beams in the silica-glass workpiece. The above result shows that a hologram with a diameter of about 100 μm, a thickness of about 70 μm can be recorded up to an embedding depth of about 2 mm from the surface of silica glass by the irradiation of an interfering picoseconds pulsed laser beams.

EXAMPLE 2

The two-beam laser interfering exposure apparatus illustrated in FIG. 1 was used. That is, a laser was the regenerative-amplifier titanium-sapphire laser for generating a pulsed laser light with an oscillation center frequency of about 800 nm, a pulse width $\tau$ of about 100 femtoseconds, and a pulse energy of 50 μJ/pulse for each of the two beams. The pulsed laser light was divided into two beams by the half mirror HF1, and converged by the lens L1 and the lens L2. An optical delay circuit and an optical-path positioning circuit were interposed in one of the optical paths for the beam B1 and the beam B2, and the converged spots of the two beams were matched with one another temporally and spatially according to the intensity of the third harmonic generation wave induced by air.

The size of the matched spot was about 100 μm, and the peak density was calculated as about 1 $J/cm^2$. The incident angle of the beams B1 and B2 at the workpiece was set at 45-degree. Then, a pulse-width compression optical circuit in a regenerative amplifier of the titanium-sapphire laser was adjusted while maintaining the optical circuit in the same state, to create a chirping so as to increase the pulse width τ up to the range greater than 100 femtoseconds to 2 picoseconds while maintaining the energy/pulse at 100 μJ. In this state, the two beams are matched at the matched spot temporally and spatially.

Figure 3:
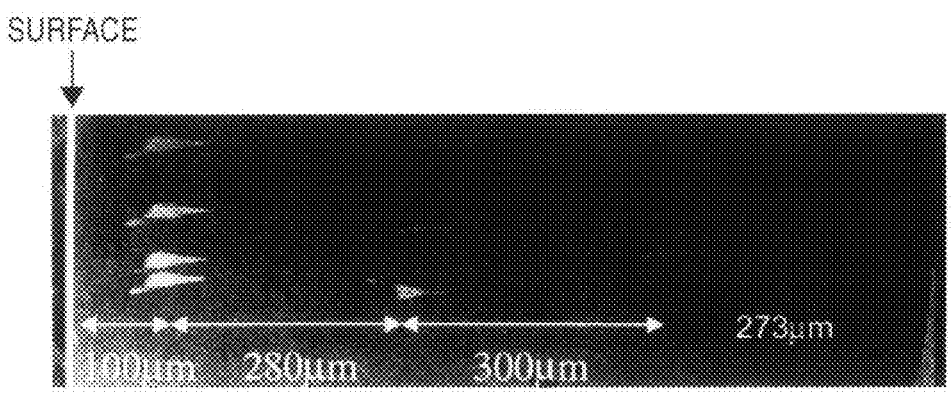
FIG. 3 is a photograph showing a scanning electron microscope (SEM) image of the section of a hologram produced in Example 2.

A silica-glass workpiece was positioned to allow the matched spot to be located at a depth of about 100 μm from the surface of the workpiece, and irradiated with the picosecond pulsed laser beams one time. Further, after the workpiece was moved vertically by about 300 μm, and then irradiated with the picosecond pulsed laser beams one time. According to observation using an optical microscope, it was proved that three holograms are recorded in the vertical direction in a multiple manner. A sectional SEM image of these holograms is shown in FIG. 3. It was verified that three holograms are recorded at embedding depths of 100 μm, 380 μm and 680 μm, respectively.

EXAMPLE 3

The two-beam laser interfering exposure apparatus illustrated in FIG. 1 was used. That is, a laser was the regenerative-amplifier titanium-sapphire laser for generating a pulsed laser light with an oscillation center frequency of about 800 nm, a pulse width τ of about 100 femtoseconds, and a pulse energy of 50 μJ/pulse for each of the two beams.

The pulsed laser light was divided into two beams by the half mirror HF1, and converged by the lens L1 and the lens L2. An optical delay circuit and an optical-path positioning circuit were interposed in one of the optical paths for the beam B1 and the beam B2, and the converged spots of the two beams were matched with one another temporally and spatially according to the intensity of the third harmonic generation wave induced by air. The size of the matched spot was about 100 μm, and the peak density was calculated as about 1 J/cm$^2$.

The incident angle of the beams B1 and B2 at the workpiece was set at 45-degree. Then, a pulse-width compression optical circuit in a regenerative amplifier of the titanium-sapphire laser was adjusted while maintaining the optical circuit in the same state, to create a chirping so as to increase the pulse width τ up to the range greater than 100 femtoseconds to 2 picoseconds while maintaining the energy/pulse at 100 μJ. In this state, the two beams are matched at the matched spot temporally and spatially.

Figure 4:
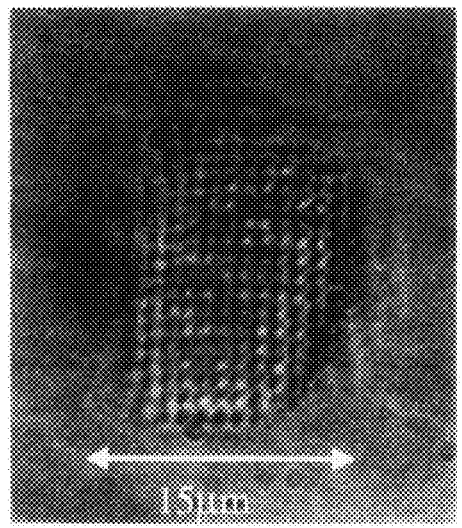
FIG. 4 is a photograph showing a scanning electron microscope (SEM) image of the section of a hologram produced in Example 3.

A silica-glass workpiece was positioned to allow the matched spot to be located at a depth of about 100 μm from the surface of the workpiece, and irradiated with the picosecond pulsed laser beams one time. Then, after the silica-glass workpiece was rotated by 90-degree, the position of the silica glass workpiece was adjusted to allow the matched spot to be overlapped with the recorded hologram, and then irradiated with the picosecond pulsed laser beams one time. According to observation using an optical microscope, a 2-dimensional hologram image as shown in FIG. 4 could be observed when the focal depth was displaced by about 100 μm from the surface of the silica glass workpiece. FIG. 4 is a photograph showing a scanning electron microscope (SEM) image of the section of the hologram. This result shows that a 2-dimensional embedded hologram can be recorded by the double irradiations of an interfering picosecond pulsed laser beams.

What is claimed is:

1. A method of producing a hologram through a two-beam laser interferometric exposure process, said method comprising:
    emitting a coherent laser light with a laser power of 10 μJ/pulse or more using a solid-state laser as a light source;
    dividing the pulsed light from said laser into two beams; and
    conversing the two beam on a surface of or within a workpiece for recording a hologram while controlling said two beams temporally and spatially in such a manner that the respective converged spots of the two beams are matched with one another temporally and spatially to create the interference therebetween so as to record a surface-relief hologram on the surface of the workpiece or an embedded hologram within the workpiece in an irreversible manner, wherein:
    a femtosecond pulsed laser light is from a mode-lock titanium-sapphire laser serving as said solid-state laser, and the phase compensation of said pulsed laser light is relaxed to allow said laser light to having a pulse width increased up to the range of greater than 900 femtoseconds to 100 picoseconds.

2. The method as defined in claim 1, wherein said converged spots of said two beam are matched with one another temporally and spatially according to either one of the third harmonic wave or triple frequency wave of a femtosecond laser light induced by the non-linearity of air, and the second harmonic wave or double frequency wave of a femtosecond laser light induced by a non-linear optical crystal, and then the pulse width of said laser light is increased up to the range of greater than 900 femtoseconds to 100 picoseconds while maintaining the optical arrangement for said two-beam laser interferometric exposure process to provide the temporally/spatially matched spot of said two beam.

3. The method as defined in claim 1 or 2, wherein said embedded hologram is recorded in a depth of 10 μm or more from the surface of the workpiece in an irreversible manner.

4. The method as defined in claim 1 or 2, wherein said two-beam laser interferometric exposure process is performed plural times to record a plurality of identical or different holograms at one or more positions in a multiple manner within the workpiece formed in one piece.

5. The method as defined in claim 1 or 2, which including, after recording the hologram on the surface of or within the workpiece, changing the depth of said matched spot from the surface of the workpiece to record an additional hologram in a multilayer manner.

6. The method as defined in claim 1 or 2, which including, after recording the hologram on the surface of or within the workpiece, rotating the workpiece by 90-degree, and irradiating said hologram with the interfering two beams to form a 2-dimensional hologram.

7. The method as defined in claim 1 or 2, wherein said workpiece is made of a material selected from the group consisting of silica glass, BK 5 glass, multi-component glass, MgO, LiNbO$_3$, Al$_2$O$_3$, ZnS, ZnSe, ZnO, YSZ (yttria stabilized zirconia), AlN, GaN, AlAs and GaAs, and mixtures thereof, and formed in bulk or thin-film.

8. The method as defined in claim 1 or 2, wherein said workpiece is made of a metal material selected from the group consisting of gold, silver, platinum, copper, nickel, chromium, aluminum, cadmium, tantalum, hard metal and metal-silicon.

9. A hologram which is formed in a workpiece in a given structure including a surface-relief and an embedded structure through the method as defined in claim 1 or 2, said workpiece being made of either one of a compound material, a semiconductor material and a metal material which are transparent to a visible light.

* * * * *